(12) United States Patent
Boffelli et al.

(10) Patent No.: US 7,472,778 B2
(45) Date of Patent: Jan. 6, 2009

(54) DEVICE FOR TRANSMITTING THE MOVEMENT TO FANS, IN PARTICULAR OF VEHICLES

(75) Inventors: Piercarlo Boffelli, Milan (IT); Claudio Bellotti, Cerro Al Lambro (IT); Erminio Depoli, Crema (IT); Fabio Natale, San Donato Milanese (IT); Mariano Turco, Mondovi' (IT)

(73) Assignee: Baruffaldi S.p.A. (IT)

( * ) Notice: Subject to any disclaimer, the term of this patent is extended or adjusted under 35 U.S.C. 154(b) by 315 days.

(21) Appl. No.: 11/316,640

(22) Filed: Dec. 21, 2005

(65) Prior Publication Data

US 2006/0137956 A1 Jun. 29, 2006

(30) Foreign Application Priority Data

| Dec. 28, 2004 | (IT) | .......................... MI2004A2530 |
| May 25, 2005 | (IT) | .......................... MI2005A0961 |
| May 25, 2005 | (IT) | .......................... MI2005A0966 |

(51) Int. Cl.
*F16D 27/112* (2006.01)
(52) U.S. Cl. ............... 192/48.2; 192/84.31; 192/84.961
(58) Field of Classification Search .............. 192/84.31; 123/41.11
See application file for complete search history.

(56) References Cited

U.S. PATENT DOCUMENTS

2001/0017250 A1* 8/2001 Boffelli et al. ............. 192/48.2

FOREIGN PATENT DOCUMENTS

| DE | 3203143 | 8/1983 |
| DE | 19821098 | 11/1999 |
| EP | 0886047 | 12/1998 |
| EP | 1002940 | 5/2000 |
| EP | 1227226 | 7/2002 |
| EP | 1400697 | 3/2004 |
| GB | 1405994 | 9/1975 |

* cited by examiner

*Primary Examiner*—Richard M. Lorence
*Assistant Examiner*—Edwin A. Young
(74) *Attorney, Agent, or Firm*—Seyfarth Shaw LLP

(57) ABSTRACT

A device for transmitting the movement to a fan for cooling the cooling fluid in a motor vehicle, mounted, by means of an idle support, on an axis parallel to the longitudinal axis (X-X) of the driving shaft of the vehicle, said device comprising movement generating means which are coaxial and integral with the driving shaft; means for transmitting the movement of the driving shaft to a first clutch; at least one first friction clutch with an electromagnetic actuating system, which is arranged on an axis parallel to the longitudinal axis (X-X) of the driving shaft and the rotor of which is connected to said movement transmission means and the engagement of which produces a rotation of the fan at a number of revolutions at least equal to that of the movement generating means.

85 Claims, 14 Drawing Sheets

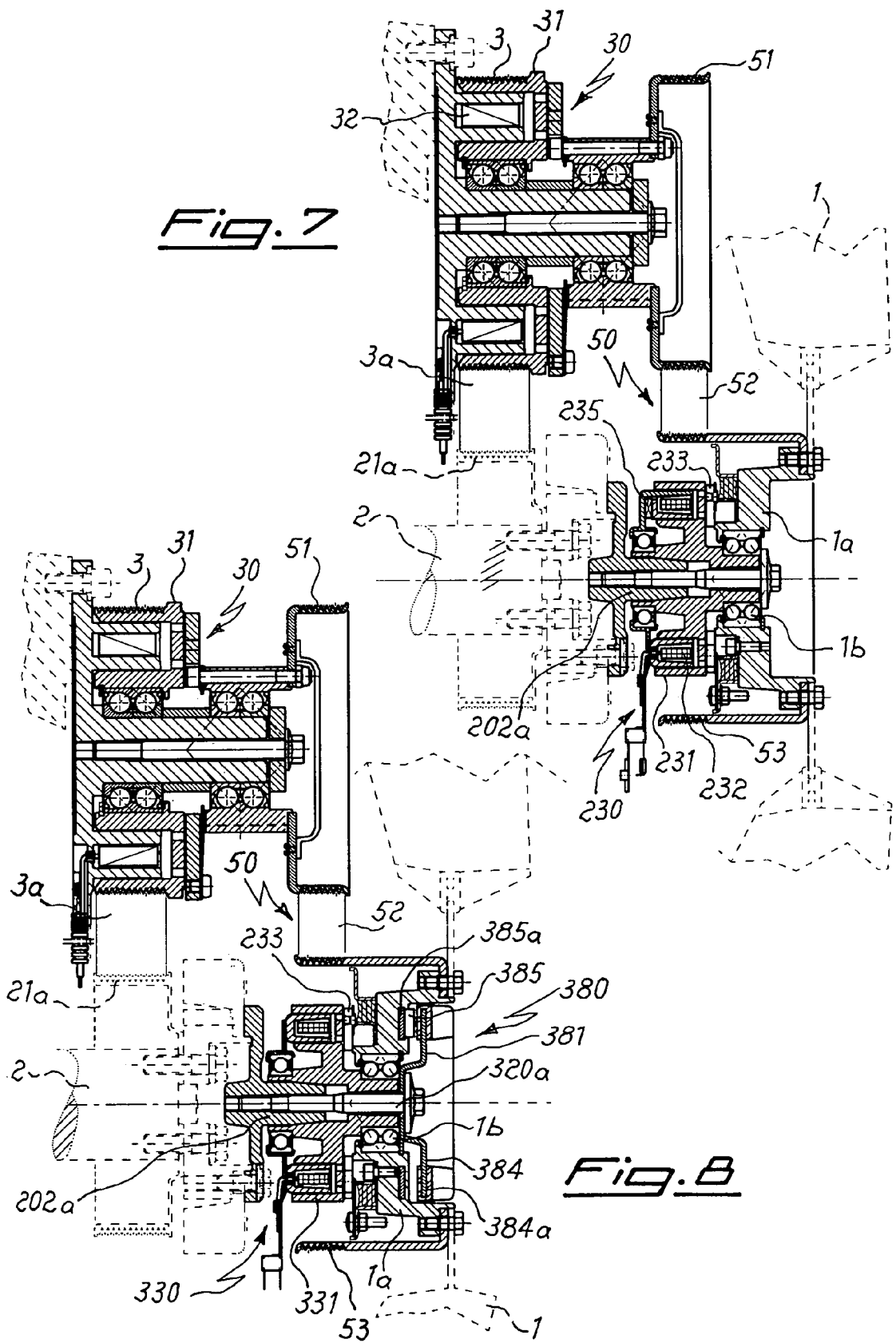

DEVICE FOR TRANSMITTING THE MOVEMENT TO FANS, IN PARTICULAR OF VEHICLES

BACKGROUND OF THE INVENTION

The present invention relates to a device for transmitting the movement to fans for cooling the cooling fluid in vehicles, arranged coaxially with the driving shaft thereof.

It is known in the technical sector relating to the cooling of cooling fluids contained in motor-vehicle radiators that there exists the need to force air onto the radiator in order to obtain more rapid dissipation of heat from the fluid to the exterior, said forced air flow being obtained by causing rotation of a fan which is normally mounted on the water pump shaft or on the driving shaft or on a driven and fixed shaft carrying a pulley which receives movement from a belt actuated by the driving shaft.

It is also known that said fan must be made to rotate only upon reaching a certain predefined temperature of the water detected by means of a thermostat which activates an electromagnetic clutch, closing of which causes the fan to start rotating.

More particularly it is required that a motor vehicle fan must be able to rotate:
- at a lower speed than that of the transmission shaft for cooling in low external temperature conditions;
- at a speed equal to or even greater than that of the transmission shaft in the case of higher external temperatures or use in severe conditions which cause overheating of the engine;
- at zero speed, namely with the fan which does not rotate at all and remains in an idle condition with respect to the transmission shaft, in the case of particularly low temperatures at which further cooling is of no use or even damaging.

In an attempt to achieve these performance features, coupling systems of the mixed type with electromagnetically operated friction clutches and drive couplings based on the use of parasitic currents generated by rotation of a conducting element in the vicinity of permanent magnets have been developed.

DE-32 03 143 describes, for example, an arrangement in which the driving shaft is connected to the rotor of an electromagnetic clutch, which is engaged by an armature connected to the fan for direct driving, whereas slow speed operation makes use of the engagement between a conducting disk, rotating with the transmission shaft, and the permanent magnets integral with the fan, said engagement causing transmission of movement at a low speed as a result of relative slipping between the two parts. With this solution, however, it is not possible to obtain the idle condition of the fan.

In addition to this, the known devices do not envisage the possibility of maintaining an albeit slow rotation of the fan in the case of breakage and/or complete interruption of the power supply to the coils of the clutches as occurs for example in the event of a total electrical failure.

Said devices are applied to cooling fans, the axis of rotation of which is arranged in a position slightly higher than the axis of the driving shaft in order to limit the radial dimensions of the fan and obtain rotational speeds thereof greater than those of the driving shaft.

The evolution of vehicles, in particular large-size vehicles such as lorries and the like, however, is progressing in such a way that it is preferred to design the driving cabs so that they are arranged as close as possible to the ground in order to reduce the friction and improve the air penetration coefficient of the vehicle; this arrangement of the cab, however, is made difficult by the said raised position of the fan which therefore must be displaced into a position substantially coaxial with the driving shaft.

BRIEF SUMMARY OF THE INVENTION

The technical problem which is posed, therefore, is that of providing a device for transmitting the rotating movement to a fan for cooling the cooling fluid in motor vehicles, which allows the fan to rotate at a number of revolutions which is different from that of the driving shaft and able to be determined depending on the actual cooling requirement of the engine, which device has compact dimensions and does not have large and costly projecting rotating masses and is formed by a limited number of costly parts.

Within the scope of this problem, it is also desirable that the device should be able to keep the fan stationary in an idle position and/or also ensure safety rotation of the fan also in the event of a malfunction of the associated power supply and control devices.

These technical problems are solved according to the present invention by a device for transmitting the movement to a fan for cooling the cooling fluid in a motor vehicle, according to the characteristic features set forth in the appended claims.

Further details may be obtained from the following description of a non-limiting example of embodiment of the invention provided with reference to the accompanying drawings in which:

BRIEF DESCRIPTION OF THE DRAWINGS

FIG. 7 shows a schematic axially sectioned view of a seventh embodiment of the device according to the present invention;

FIG. 8 shows a schematic axially sectioned view of an eighth embodiment of the device according to the present invention;

DETAILED DESCRIPTION OF THE INVENTION

Figure 1:
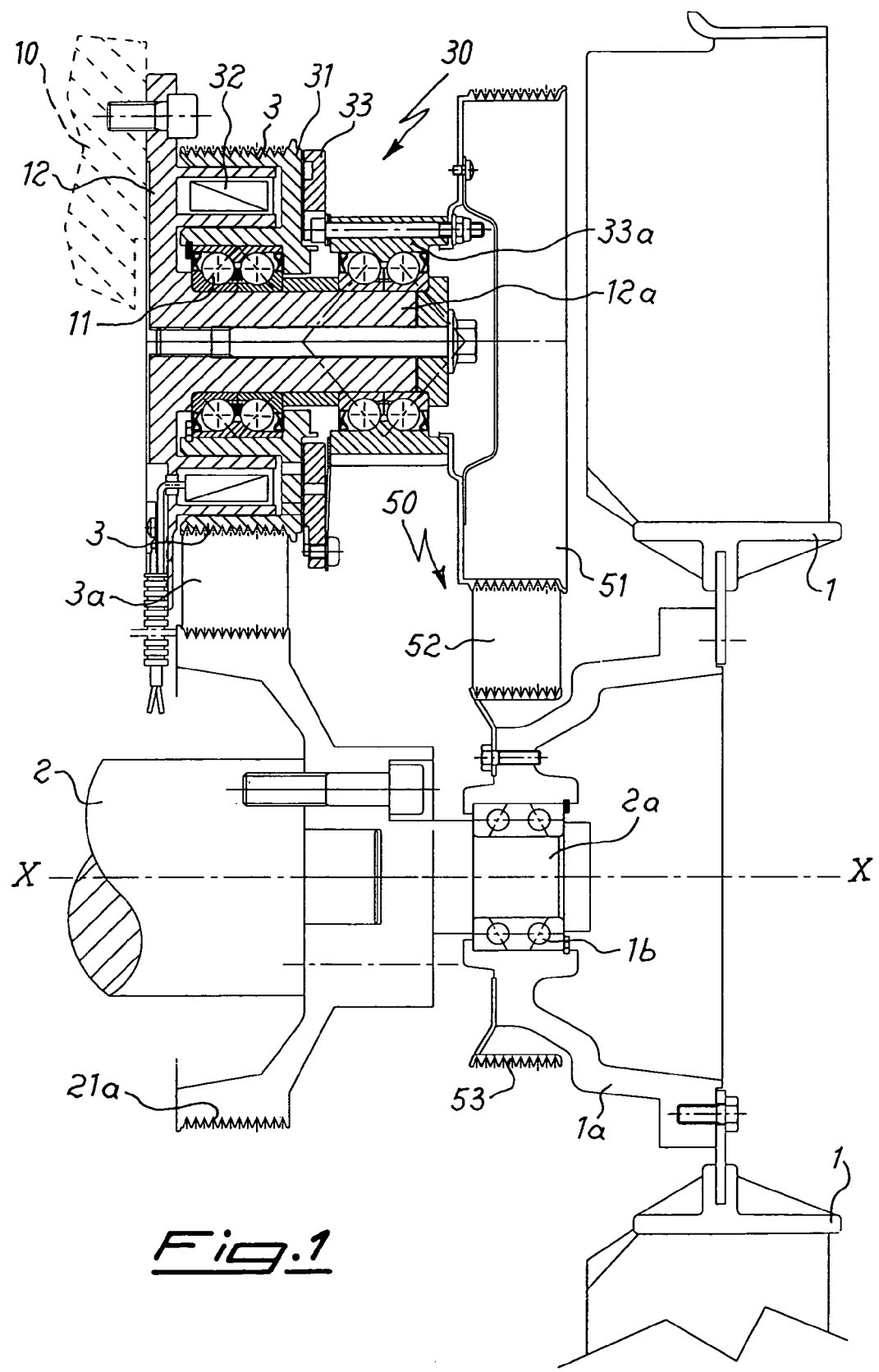
FIG. 1 shows a schematic axially sectioned view of a first embodiment of the device for transmitting the movement to the fan according to the present invention.

As shown in FIG. 1 the cooling fan 1 is constrained to a supporting bell member 1a arranged on a bearing 1b mounted on an extension 2a of the driving shaft 2 of the vehicle so as to be coaxial with the axis of rotation thereof.

On the same extension 2a of the shaft 2 there is also mounted a first actuating pulley 2b connected, by means of a belt 3a, to a second pulley 3 incorporated in the rotor 31 of a clutch described more fully below.

For the sake of convenience of the description below "longitudinal direction X—X" will be understood as meaning that direction coinciding with/parallel to the longitudinal axis of the driving shaft.

In greater detail said rotor 31 is mounted on a bearing 11 keyed onto a longitudinal hollow sleeve 12a of a fixed support flange 12 integral with the base 10 of the engine and forms the rotating element of a clutch 30 formed by an annular electromagnet 32, concentric with the rotor 31, axially arranged between the latter and the fixed flange 12 and electrically connected to a thermostat (not shown) for example for the temperature of the cooling water.

The armature 33 of the clutch 30 is arranged on the opposite side to the electromagnet 32, with respect to the rotor 31, in the axial direction and is connected to the thrust piece of a bearing 33a in turn keyed onto the hollow sleeve 12a; said thrust piece also has, constrained thereto, a drive 50 comprising a first drive pulley 51 connected, via a drive belt 52, to a second drive pulley 53 in turn constrained to the bell member 1a supporting the fan 1.

With this configuration it is possible to obtain two different speeds of rotation of the fan 1, i.e.:

when the electromagnet 32 is excited and the clutch 30 therefore engaged, the movement of the driving shaft 2 is transmitted to the fan 1 via the clutch 30 and the drive 50, resulting in a rotational speed of the fan greater than the rotational speed of the driving shaft;

when the clutch 30 is disengaged, the movement of the driving shaft is not transmitted to the fan 1 which remains stationary in the idle condition.

Figure 2:
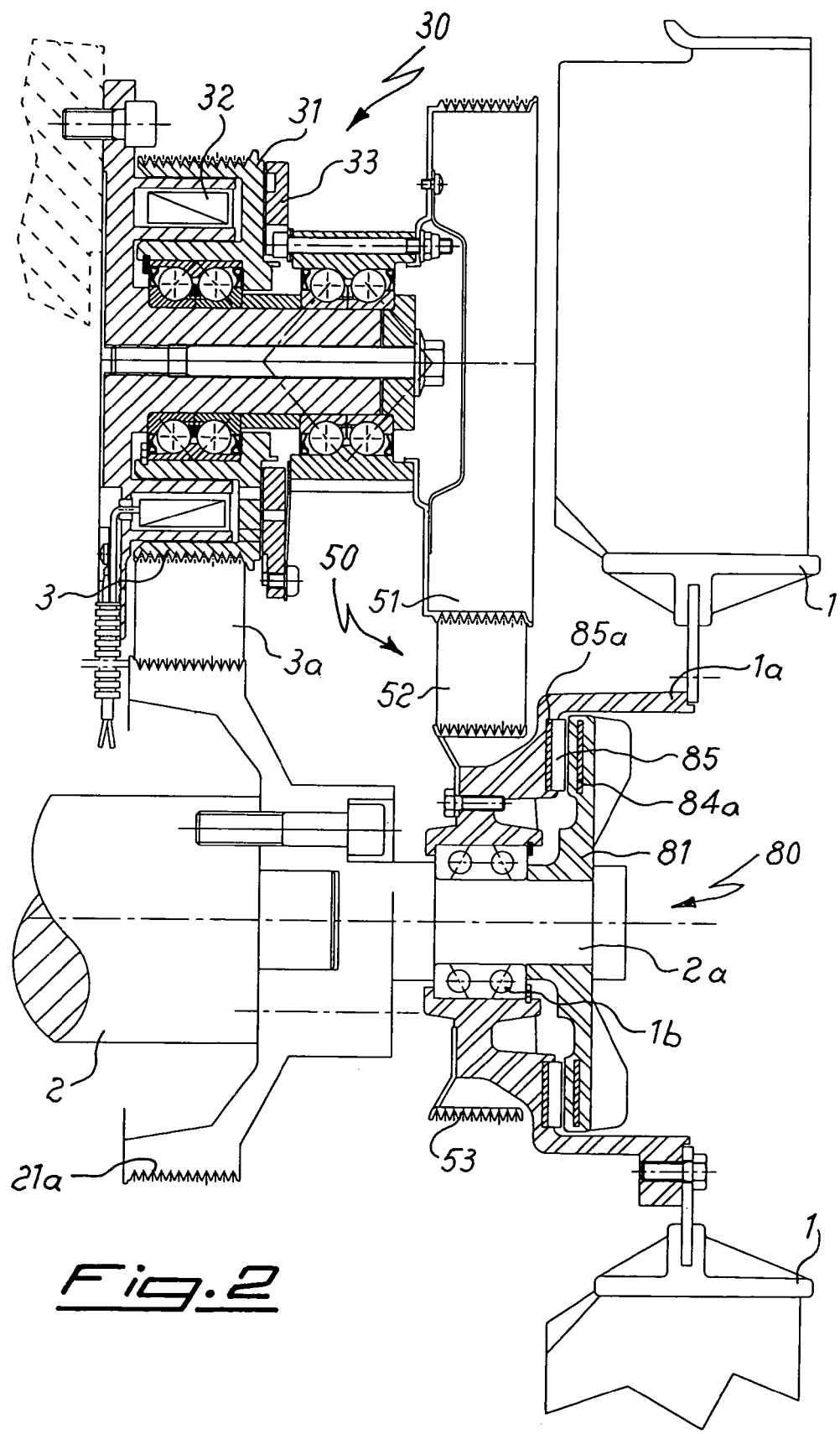
FIG. 2 shows a schematic axially sectioned view of a second embodiment of the device according to the present invention.

According to a further embodiment, shown in FIG. 2, the free end of the extension 2a of the driving shaft 2 has, mounted thereon, a second coupling 80 of the induction type which is based on Foucault currents or parasitic currents and activation of which is obtained by means of a plurality of permanent magnets 85 mounted on a retaining ring 85a, which is made of non-magnetic material and integral with the bell member 1a, and a ring 84a, which is made of conductive material and forms an annular part of a rotor 1, which is made of non-magnetic material such as, for example, aluminium and is integral with the extension 2a of the driving shaft 2.

In this way, the ring 85a and the magnets 85 form the elements for induction linkage with the annular part 84a of the rotor 81 so as to rotationally drive the bell member 1a and therefore the fan 1.

Operation of the coupling is as follows:

when the clutch 30 is disengaged, the drive formed by the pulleys 51 and 53 and by the associated belt 52 is stationary in the idle condition and the fan 1 is actuated directly by the driving shaft 2 via the Foucault coupling 80 which, owing to the relative slipping between rotor 81 and bell member 1a, results in a rotational speed of the fan less than that of the driving shaft;

when the clutch 30 is engaged, the movement is transmitted from the driving shaft 2 to the clutch 30 and from the latter to the drive 50 consisting of the pulleys 51 and 53 and the associated belt 52 which is rotationally driven and, prevailing over the coupling 80, actuates the fan 1 with a rotational speed greater than that of the driving shaft, independently of the effect of the coupling 80 itself.

Figure 3:
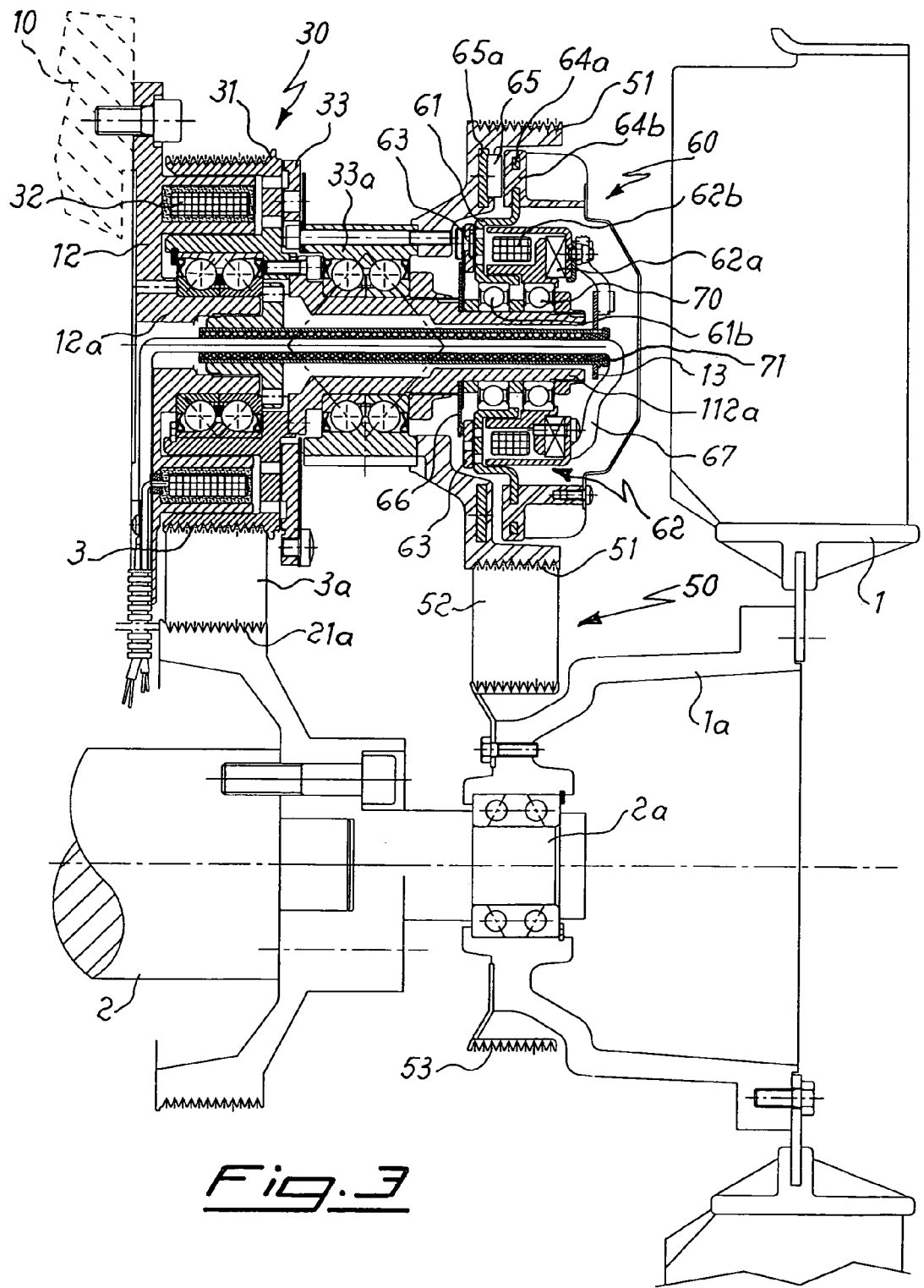
FIG. 3 shows a schematic axially sectioned view of a third embodiment of the device according to the present invention.

As shown in FIG. 3, a further embodiment of the device is also envisaged, according to which a hollow sleeve 112a is integrally joined to the rotor 31 of the clutch 30 and has, mounted on its free end, a second controlled clutch 60 of the mixed friction/induction type based on Foucault currents or parasitic currents.

An internally hollow fixed spindle 13 is arranged coaxially with and inside the said sleeve 112a and is able to receive, passing through it, electric wires 67.

Engagement of the clutch 60 is obtained by means of associated friction means consisting of a second annular electromagnet 62 in turn coaxially mounted on the hollow sleeve 112a via a bearing 70 arranged in between and concentrically inserted inside a special annular seat of the rotor 61 of the second clutch 60.

The support of the magnet 62 is constrained to the fixed support shaft 13 via resilient means 71.

Said rotor 61 is in turn mounted on an associated bearing 61b keyed onto the sleeve 112a.

The armature 63 of the second clutch is arranged on the side of the rotor 61 opposite to that of the electromagnet 62 and is rotationally constrained to the sleeve 112a by means of a resilient membrane 66 able to allow the displacement of the armature in the axial direction, but not its rotation about the longitudinal axis.

The electromagnet 62 is of the type with a permanent magnet 62a which constantly attracts the armature 63 until the controlled energisation of the coil 62a neutralizes the magnetic field of the said magnet 62a.

As mentioned, the second clutch 60 is of the mixed type and the induction part based on the parasitic or Foucault currents comprises a plurality of permanent magnets 65 mounted on a retaining ring 65a, which is made of non-magnetic material and integral with the first drive pulley 51, and a ring 64a, which is made of conductive material and forms an annular part of the rotor 61 together with which a non-magnetic element 64a, consisting for example of aluminium, is cast.

In this way the ring 65a and the magnets 65 form the elements for induction linkage with the annular part 64a of the rotor so as to rotationally drive the first drive pulley 51 and therefore the fan 1.

As in the cases previously described, the first drive pulley 51 is connected by means of a drive belt 52 to the second drive pulley 53 integral with the bell member 1a supporting the fan 1.

Operation of the coupling is as follows:

if both the electromagnet 32 and the coil 62b of the second clutch 60 are kept de-energized, the armature 33 of the first clutch 30 remains separated from the rotor 31, while the armature 63 of the second clutch 60, recalled by the magnet 62a, engages with the rotor 61 which, starting to rotate, causes the formation of parasitic induction currents between the elements 64a and 65a of the clutch 60 which rotationally drives the first drive pulley 51 and therefore the fan 1 via the drive 50.

Since driving of the first drive pulley 51 by the rotor 61 is performed with relative slipping, the fan will rotate at a speed lower than that of the pulley 3 actuated by the driving shaft;

if the electromagnet 32 of the first clutch 30 is activated, the armature 33 is recalled into contact with the rotor 31 together with which it starts to rotate, causing rotation of the first drive pulley 51 and hence the fan 1, at a number of revolutions equal to that of the pulley 3 actuated by the driving shaft 2 via the pulley 2b;

if the coil 62b of the second clutch is excited, de-energizing the electromagnet 32 of the first clutch 30, both the armatures 33 and 63 of the respective clutches remain separated from the associated rotor 31/61, and consequently the first drive pulley 51 and therefore the fan 1 remain stationary in the idle condition with respect to the driving shaft 2.

In the event of total failure or interruption of the electric power supplying the electromagnets 32 and 62, the magnet 62a of the second clutch attracts the armature 63, starting the rotor 61 which via the clutch 64 maintains an albeit slight rotation of the fan (so-called "fail safe" mode).

Figure 4:
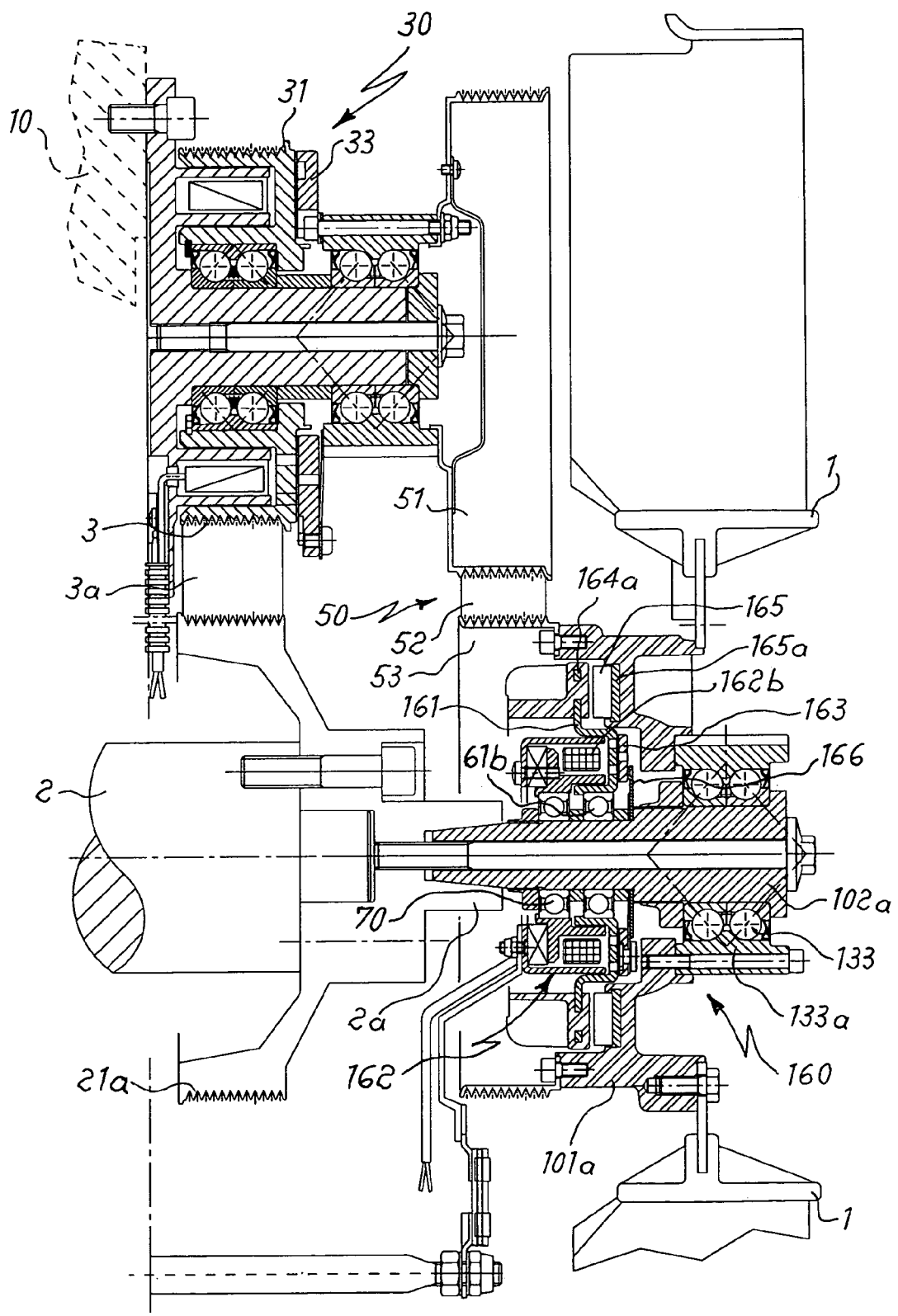
FIG. 4 shows a schematic axially sectioned view of a fourth embodiment of the device according to the present invention.

FIG. 4 shows an embodiment of the device according to the invention which is substantially similar to that of FIG. 3, producing the same operating effects, but with the second clutch 160 displaced into a position coaxial with the driving shaft 2.

In greater detail, said second clutch 160 is mounted on a sleeve 102a coaxially integral with the extension 2a of the shaft 2; the following are keyed onto said sleeve 102a:

the bearing 70 supporting the fixed annular electromagnet 162;

the bearing 61b supporting the rotor 161;

the armature 163 which is rotationally constrained to the sleeve 102a by means of a resilient membrane 166 able to allow the displacement of the armature in the axial direction, but not its rotation about the longitudinal axis;

the bearing 133 on the thrust piece 133a of which the support 101a of the fan 1 is mounted.

In the configuration according to FIG. 4, the said support 101a supports the permanent magnets 165 and the non-magnetic ring 165a of the parasitic current engaging part and is also constrained to the second drive pulley 53.

With this configuration operation of the coupling is as follows:

if both the electromagnet 32 and the coil 162b of the second clutch 160 are kept deactivated, the armature 33 of the first clutch 30 remains separated from the rotor 31, while the armature 163 of the second clutch 160, being recalled by the magnet 162a, engages with the rotor 161, causing rotation thereof and resulting in the formation of parasitic induction currents between the elements 164a and 165a of the clutch 160 which rotationally drives the support 101a of the fan 1; since driving of the support 101a by the rotor 161 is performed with relative slipping, the fan will rotate at a slower speed than that of the driving shaft 2;

if the electromagnet 32 of the first clutch 30 is energized, the armature 33 is recalled into contact with the rotor 31 together with which it starts to rotate, causing rotation of the first drive pulley 51, and therefore the fan 1, at a number of revolutions equal to that of the pulley 3 actuated by the driving shaft 2 via the pulley 2b;

if the coil 162b of the second clutch 160 is excited, de-energizing the electromagnet 32 of the first clutch 30, both the armatures 33 and 163 of the respective clutches remain separated from the associated rotor 31/161, and consequently both the first drive pulley 51 and the support 101a and therefore the fan 1 remain stationary in the idle condition with respect to the driving shaft 2.

In the event of total failure or interruption of the electric power supplying the electromagnets 32 and 162, the magnet 162a of the second clutch attracts the armature 163 starting the rotor 161 which via the clutch 160 maintains rotation of the fan at a the same speed as that of the sleeve 102a (so-called "fail safe" mode).

It can therefore be seen how with the transmission device according to the invention it is possible to obtain the required rotational speeds of the fan at a number of revolutions which are different (higher/lower/zero revolutions) compared to the revolutions of the movement generating shaft, as well as safe rotation in the case of a fan arranged coaxially with the driving shaft and without high projecting rotating loads on the fixed support.

In particular it is possible to obtain a number of revolutions greater than that of the driving shaft in operating conditions of the engine which produce overheating and therefore require a large flow of forced air onto the radiator.

Although not illustrated, it is envisaged that the device according to the invention may be designed with a second clutch of the magnetic hysteresis type instead of an induction clutch.

In this case the permanent magnets supported by a ring are arranged on the rotor 61;161 of the second clutch 60;160, while a ring of magnetically semi-hard material is constrained to the bell member 1a.

Operation of the device remains substantially unchanged.

In the embodiments shown in FIGS. 3 and 4 it is also envisaged that:

the membrane 66/166 of the armature 63/163 of the second clutch 60/160 is directly constrained to the rotating sleeve 112a/102a;

the armature 33 of the first clutch 30 is directly fixed to the associated bearing 33a.

Figure 5:
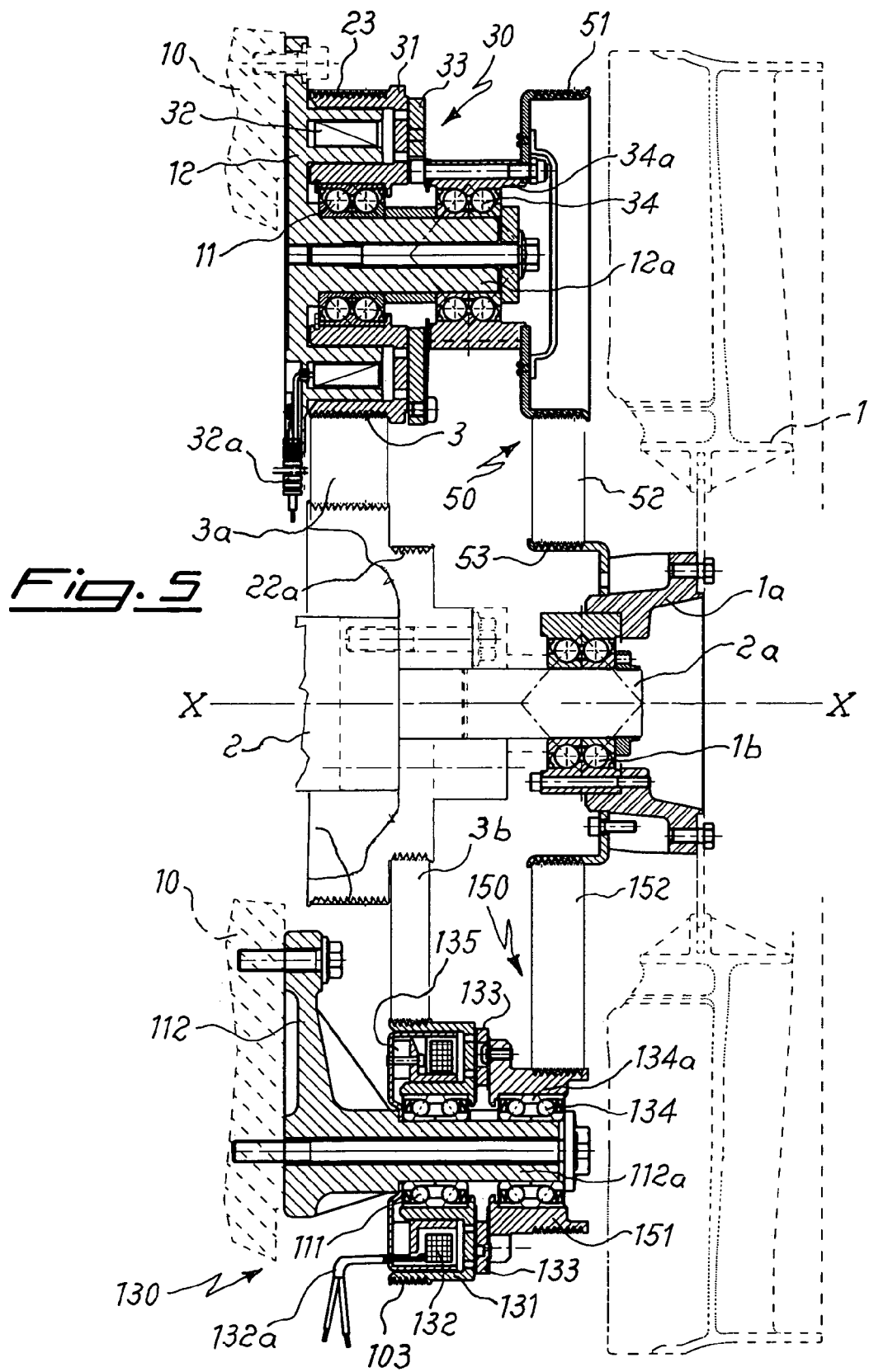
FIG. 5 shows a schematic axially sectioned view of a fifth embodiment of the device for transmitting the movement to the fan according to the present invention.

As shown in FIG. 5 the cooling fan 1 is constrained to a supporting bell member 1a arranged on a bearing 1b mounted on an extension 2a of the driving shaft 2 of the vehicle so as to be coaxial with the axis of rotation thereof.

On the same extension 2a of the shaft 2 there is also mounted a flange shaped so as to have a first actuating pulley 21a connected, by means of a belt 3a, to the pulley 3 of a rotor 31 of a first clutch 30, and a second pulley 22a connected by means of a respective belt 3a to a pulley 103 of the rotor 131 of a second clutch 130.

In greater detail said rotor 31 forms the rotating element of a clutch 30 comprising an annular electromagnet 32 connected at 32a to a thermostat (not shown) for example for the temperature of the cooling water, in a similar manner to the embodiment according to FIG. 1.

The said rotor 131 forms the rotating element of a second clutch 130 and is mounted on a bearing 111 keyed onto a longitudinal hollow sleeve 112a of a fixed support flange 112 integral with the base 10 of the engine; said second clutch 130 is entirely similar to the first clutch 30 and comprises an annular electromagnet 132 which is concentric with the rotor 131, axially arranged between the latter and the fixed flange 112 and electrically connected at 132a to a thermostat (not shown) for example for the temperature of the cooling water.

The armature 133 of the clutch 130 is arranged on the opposite side to the electromagnet 132, with respect to the rotor 131, and is connected to the thrust piece 134a of a bearing 134 in turn keyed onto the hollow sleeve 112a; said thrust piece also, has constrained thereto, a pulley 151 of a second drive 150 connected, by means of a different section 152 of the said drive belt 52 of the first drive 50 of the first clutch 30, to the pulley 53 in turn constrained to the bell member 1a supporting the fan 1.

With this configuration it is possible to obtain the different required speeds of rotation of the fan 1, i.e.:
- when the electromagnet 32 is energised and the electromagnet 132 de-energised and therefore the clutch 30 engaged and the clutch 130 disengaged, the movement of the driving shaft 2 is transmitted to the fan 1 via the clutch 30 and the drive 50, resulting in a rotational speed of the fan greater than the rotational speed of the driving shaft;
- when the electromagnet 32 is de-energised and the electromagnet 132 energised and therefore the clutch 30 disengaged and the clutch 130 engaged, the movement of the driving shaft 2 is transmitted to the fan 1 via the clutch 130 and the first drive 150, resulting in a rotational speed of the fan less than the rotational speed of the driving shaft;
- when the clutch 30 and the clutch 130 are both disengaged, the movement of the driving shaft is not transmitted to the fan 1 which remains stationary in the idle condition.

Figure 6:
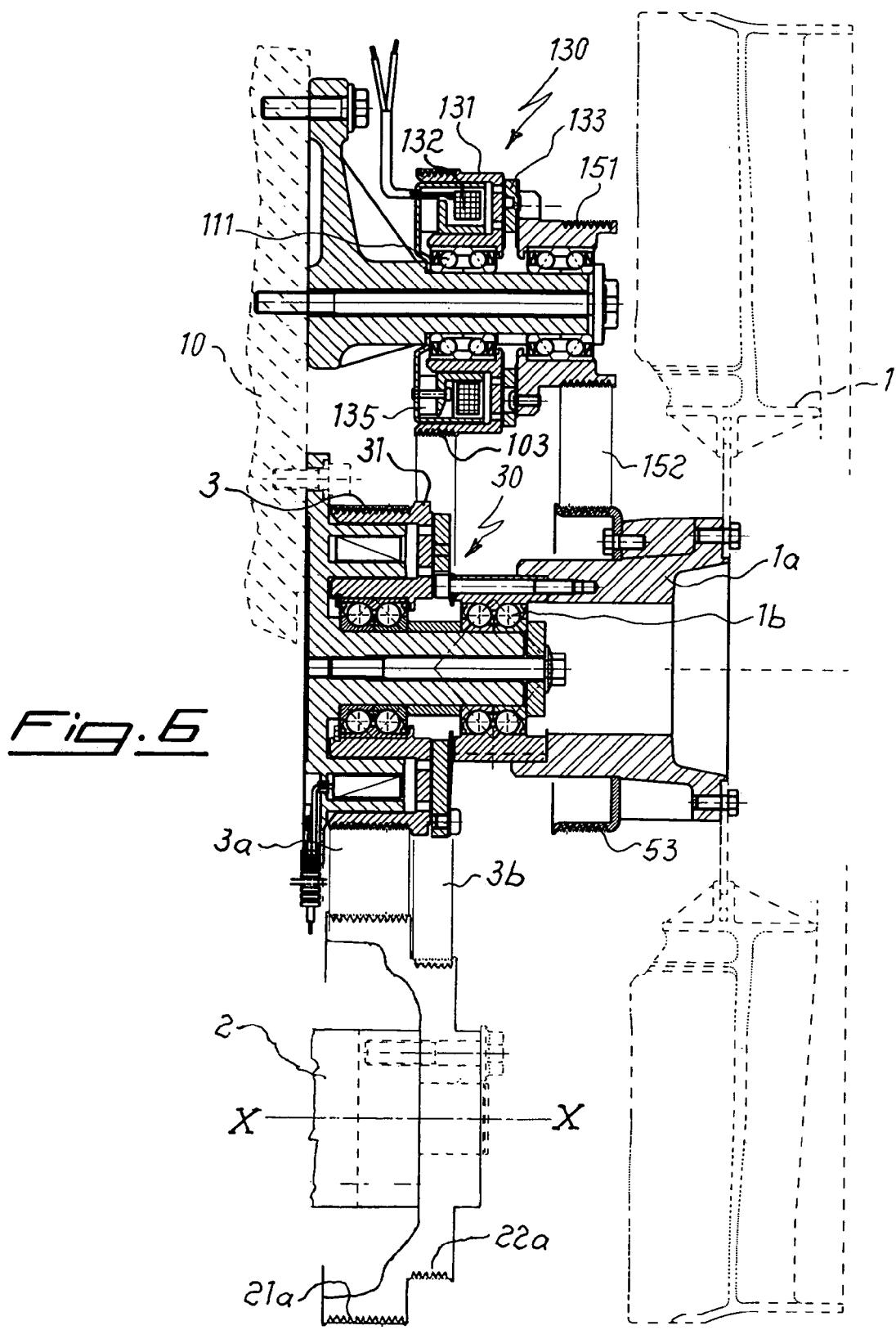
FIG. 6 shows a schematic axially sectioned view of a sixth embodiment of the device according to the present invention.

As shown in FIG. 6, a further embodiment of the device is also envisaged, wherein the fan 1 is not mounted directly on the driving shaft 2, but coaxially with the first clutch 30, and with the second clutch 130 arranged above instead of underneath the first clutch 30.

The example illustrated also envisages the presence of a permanent magnet 135 arranged behind the electromagnet 132 and able to ensure engagement of the second clutch 130 also in the event of a total electrical failure ("fail safe" mode); operation of the second clutch 130 in fact envisages in this case that the armature 133 is constantly recalled by the magnet 135, while excitation of the electromagnet, which is of the type with a controlled excitation coil 132, neutralizes the magnetic field of the magnet itself, so that the armature is released and therefore the fan is not rotationally driven.

Apart from the variation arising from the magnet 135, operation of the coupling is entirely similar to that described previously and therefore will not be described further.

It is moreover envisaged that the permanent magnet 135 may be installed in the second clutch 130 also in the configuration according to FIG. 1.

FIG. 7 shows a further embodiment of the device according to the invention which envisages that the second clutch 230 is arranged coaxially with the driving shaft 2 and has a rotor 231 connected to an extension 202a of the driving shaft and armature 233 integral with the support 1a of the fan 1.

The second clutch 230 also has a permanent magnet 235, in a similar manner to that already described in relation to FIG. 6, so as to ensure the rotation of the fan 1 also in case where breakage of the belt 52 actuating of the pulley 53 joined to the fan 1 and/or interruption of the electric power supply to the electromagnets 32,232 of both the clutches 30,230 should occur.

FIG. 8 shows a further embodiment of the device wherein it is envisaged that the second clutch 330 is arranged coaxially with the driving shaft 2 and has a rotor 331 connected to an extension 202a of the driving shaft and armature 233 integral with the support 1a of the fan 1, in a similar manner to the solution of FIG. 7; in this case it is envisaged, however, that the free end of the extension 202a of the driving shaft 2 has, mounted thereon, a second coupling 380 of the induction type, based on Foucault currents or parasitic currents, activation of which is obtained by means of a plurality of permanent magnets 385 mounted on a retaining ring 385a, which is made of non-magnetic material and integral with the support 1a of the fan 1, and a ring 384a, which is made of conductive material and forms an annular part of a rotor 384, which is made of non-magnetic material such as, for example, aluminium and is integral with the extension 202a of the driving shaft 2.

In this way the ring 385a and the magnets 385 form the elements for induction linkage with the annular part 384a of the rotor 384 in order to drive rotationally the support 1a and therefore the fan 1.

This solution ensures a slow rotation of the fan 1 also in the case of simultaneous breakage of the belt 52 and interruption in the power supply to the two electromagnets 32 and 232 of both clutches.

In view of the compact dimensions of the coupling 380, the latter does not affect the overall radial dimensions.

It can therefore be seen how with the device according to the invention it is possible to obtain considerable advantages compared to the devices which use parasitic current couplings, both as regards the high performance which can be achieved due to the fact that the reduction in speed is determined by the dimensions of the drive devices and not by the relative sliding of two parts as in the case of Foucault couplings which also produce a notable amount of heat which must be dissipated; in addition to this, the double friction clutch device, since it is not bound by the need for large dimensions associated with the Foucault coupling, allows the diameter of the axial support 1b of the fan 1 to be reduced, thus making it possible to lengthen the blades of the fan towards the axis of rotation and consequently increase the amount of air forced onto the radiator for the same maximum diameter of the fan.

Figure 9:
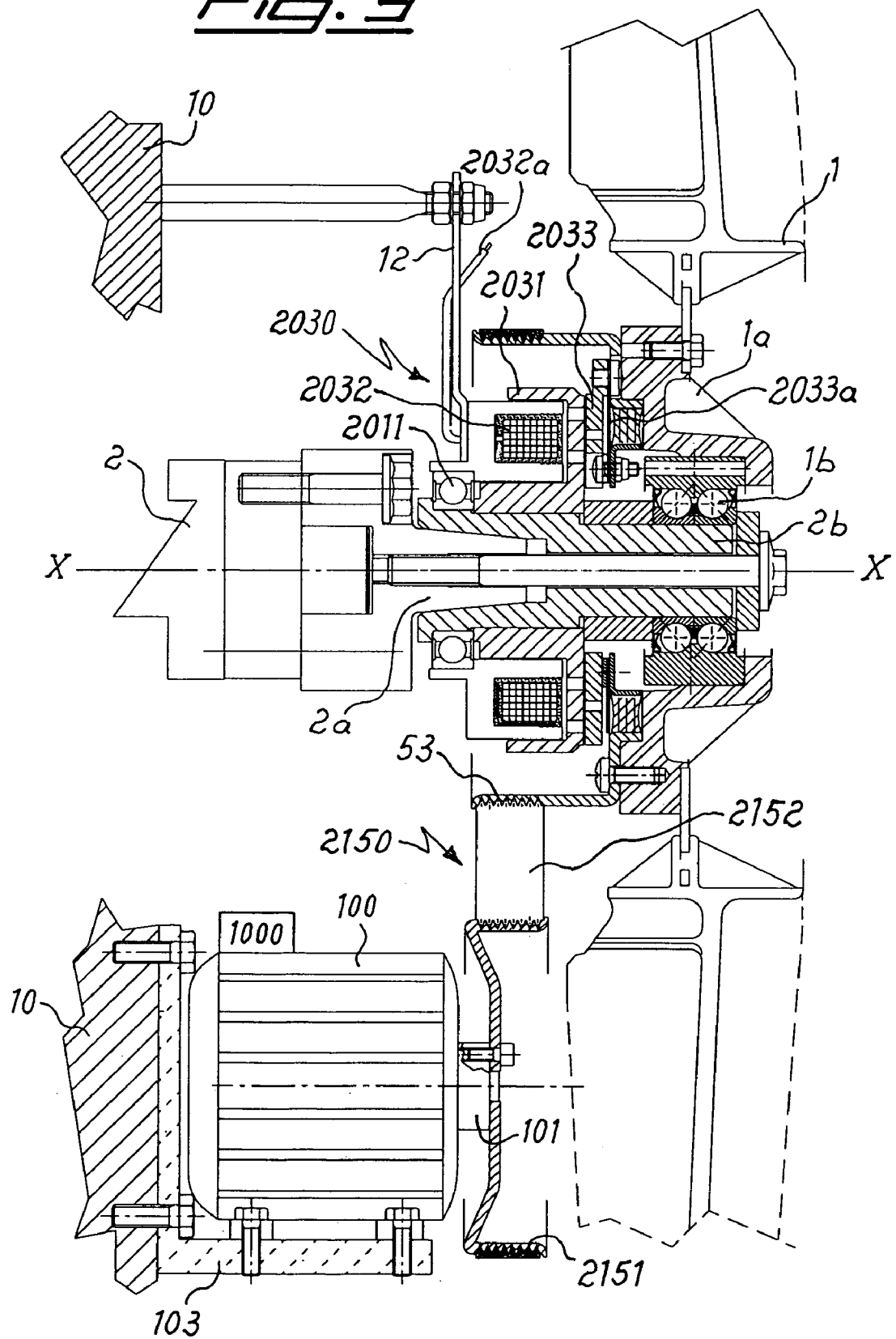
FIG. 9 shows a schematic axially sectioned view of a ninth embodiment of the device for transmitting the movement to the fan according to the present invention.

As shown in FIG. 9 in a further embodiment the cooling fan 1 is constrained to a supporting bell member 1a arranged on a bearing 1b mounted on a sleeve 2b integral with an extension 2a of the driving shaft 2 of the vehicle so as to be coaxial with the axis of rotation X—X thereof.

A coupling 2030 is arranged between the bell member 1a supporting the fan 1 and the driving shaft 2 and coaxially therewith, said coupling comprising a rotor 2031 mounted on a bearing 2011 keyed onto the longitudinal hollow sleeve 2b, integral with the driving shaft and able to form the rotating element of a friction clutch 2030 formed by a fixed annular electromagnet 2032, concentric with the rotor 2031, axially arranged between the latter and a fixed support flange 12 integral with the base 10 of the engine and electrically connected, via conductors 2032a, to a thermostat (not shown) for example for the temperature of the cooling water.

The armature 2033 of the clutch 2030 is arranged on the opposite side to the electromagnet 2032, with respect to the rotor 2031, and is connected to the bell member 1a via a resilient element 2033a able to allow axial movements of the armature 2033, but prevent relative rotation of the armature and bell member.

Between the bell member 1a and the armature 2033 there is also coaxially arranged a first pulley 53, of a drive 2150, joined to the bell member 1a itself and connected by means of a drive belt 2152 to a second pulley 2151 in turn constrained to the driving shaft 101 of an auxiliary electric motor 100 which is secured to the base 10 of the engine by means of an associated support 103.

The motor 100 is associated with programming and control means 1000 designed to regulate its speed of rotation.

With this configuration it is possible to obtain three different rotating conditions of the fan 1, i.e.:

- when the electromagnet 2032 is excited and the clutch 2030 therefore engaged, the movement of the driving shaft 2 is transmitted to the fan 1 via the clutch 2030, resulting in a rotational speed of the fan substantially the same as that of the driving shaft;
- when the clutch 2030 is disengaged, the movement of the driving shaft 2 is not transmitted to the fan 1 which is rotationally actuated by the auxiliary electric motor 100 via the drive 2150; by suitably operating the control device 1000 of the motor and/or by designing the drive 2150 with suitable dimensions it will possible to control and/or regulate the rotational speed of the fan 1 at slow speeds;
- when the clutch 2030 and motor 100 are simultaneously disengaged, the fan 1 does not receive any movement and remains stationary in the idle condition.

Figure 10:
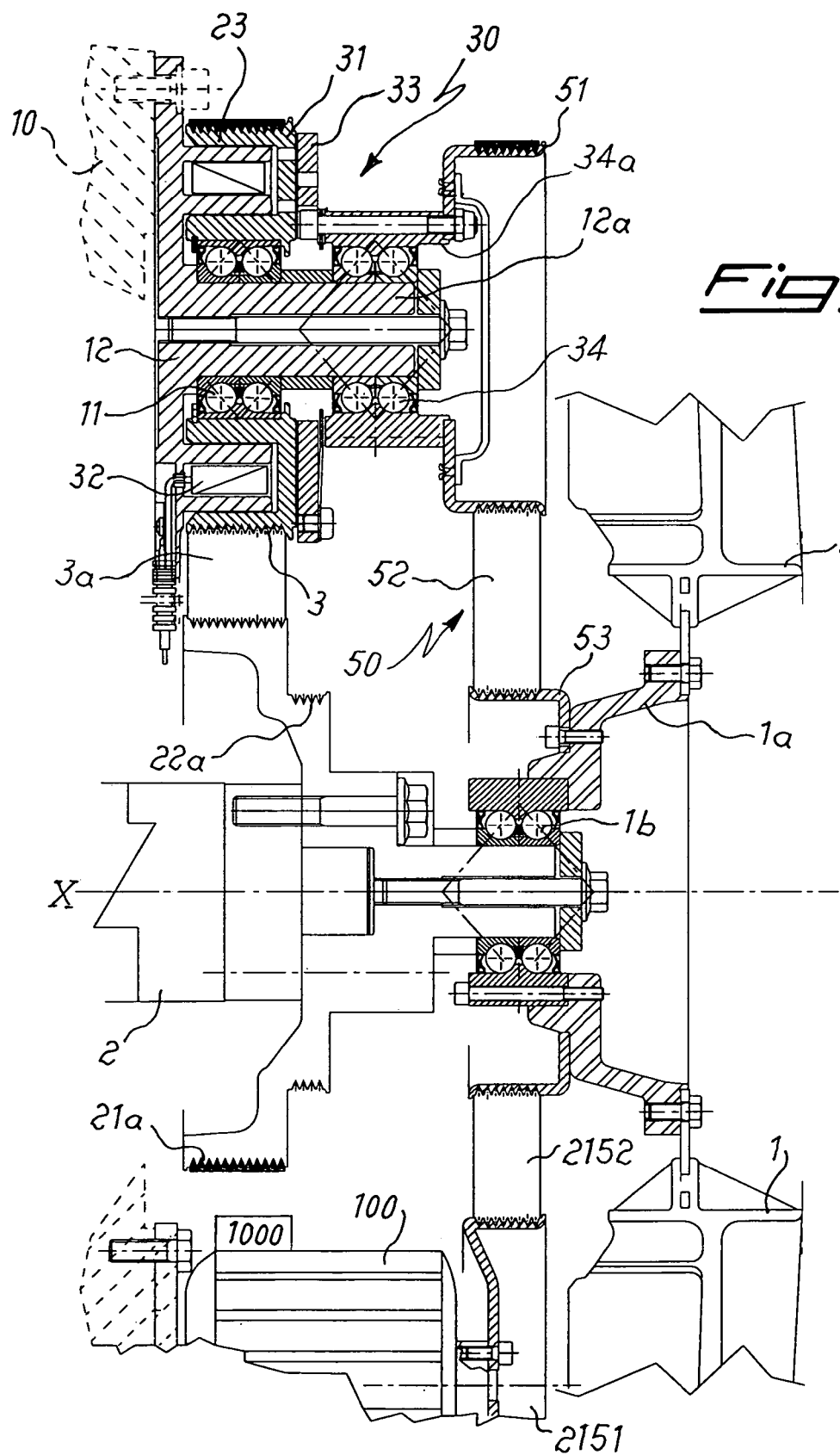
FIG. 10 shows a schematic axially sectioned view of a tenth embodiment of the device according to the present invention.

According to a further embodiment, shown in FIG. 10, and similar to the embodiment of FIG. 5, the coupling 30 is arranged on an axis which is parallel and fixed, but does not coincide with that of the driving shaft 2, while the fan 1 is still mounted on the driving shaft 2. The sleeve 212a is mounted on the said fixed axis, integrally with the flange 212 supporting the electromagnet 232.

In this configuration the rotor 31 has radial toothing designed to form a pulley 53 for engagement with a belt 3a for transmission of the movement, also wound onto a pulley 21a integral with the driving shaft 2; the motor 100 is connected to the fan 1 via the drive 2150 in a similar manner to that described for FIG. 9.

The coupling operates as follows:

- when the clutch 30 and motor 100 are deactivated, the fan 1 does not receive any movement and remains stationary in the idle condition,
- when the clutch 30 is engaged, the movement transmitted from the driving shaft 2 to the rotor 31, via the pulley 21a and the belt 3a, is transmitted from the armature 33 to the drive 50, consisting of the pulleys 51 and 53 and the associated belt 52 which causes rotation of the bell member 1a and therefore the fan 1 at a rotational speed at least equal to that of the driving shaft 2, independently of the effect of the motor 100 which, in this case, is kept idle; it is envisaged, moreover, that by designing the drive 50 with suitable dimensions, it is possible to determine a speed of rotation of the fan greater than that of the driving shaft 2;
- when the clutch 30 is disengaged, the drive consisting of the pulleys 51 and 53 with associated belt 52 is stationary in the idle condition and the fan 1 is actuated directly by the shaft 101 of the auxiliary motor 100 via the associated pulleys 2151, 53 and belt 2152, resulting in a speed of the fan 1 which is slower than that of the driving shaft 2 and able to be adjusted according to requirements by means of the devices 1000.

Figure 11:
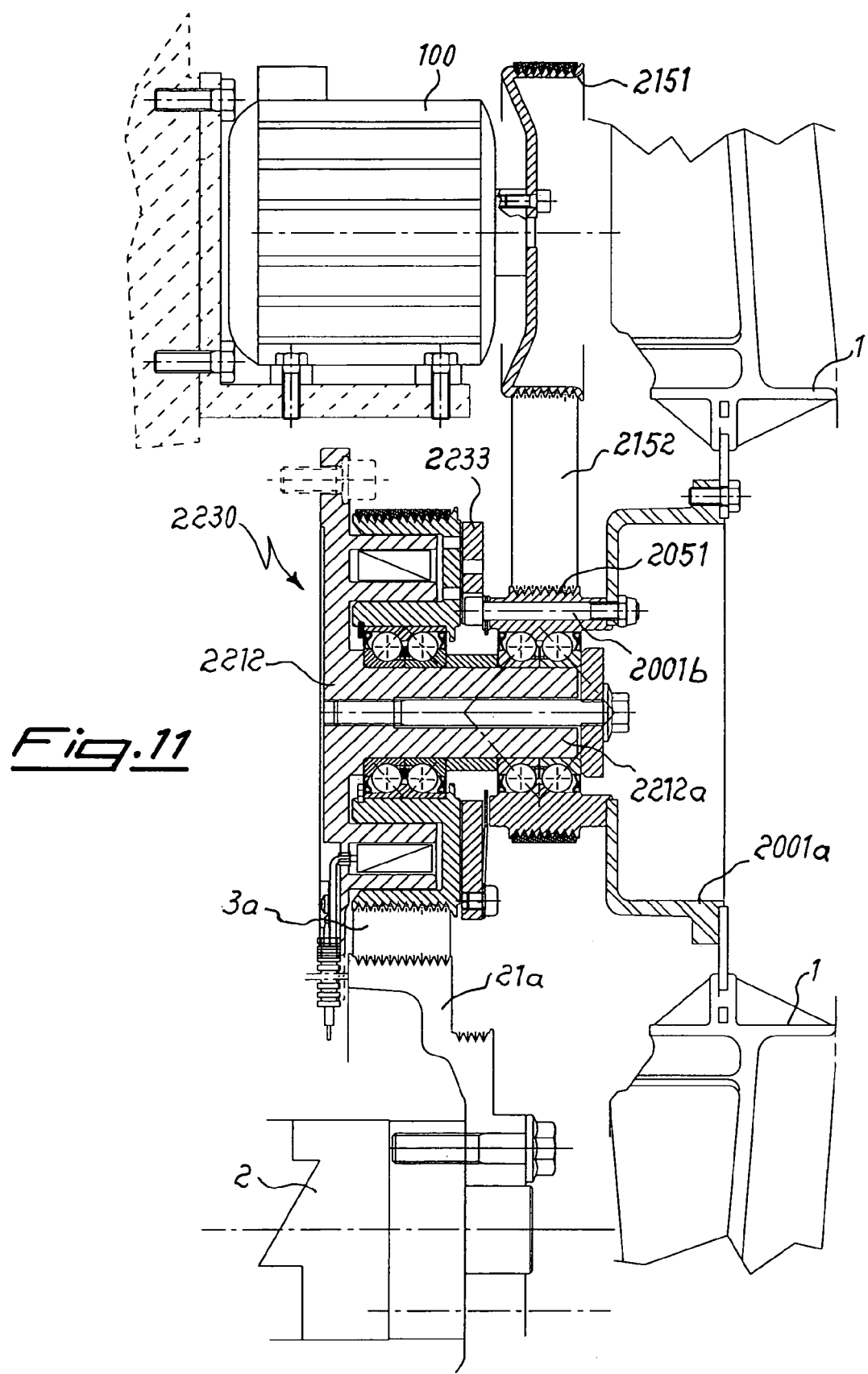
FIG. 11 shows a schematic axially sectioned view of an eleventh embodiment of the device according to the present invention.

As shown in FIG. 11, a further embodiment of the device is also envisaged, said embodiment being similar to that of FIG. 10, but with the fan 1 coaxial with the coupling 2230; according to this configuration, the thrust piece of the bearing 2001b of the fan 1 has a sleeve on which a pulley 2051 suitable for engagement with the belt 2152 integral with the pulley 2151 of the auxiliary motor 100 is formed, operation being similar to that of FIG. 10.

For the sake of convenience of the description, two belts 2052 and 2152 have been indicated, although it is evident that these may consist of different sections of a single belt which connects together the three pulleys 51,53,2151 arranged in a triangle.

Figure 12:
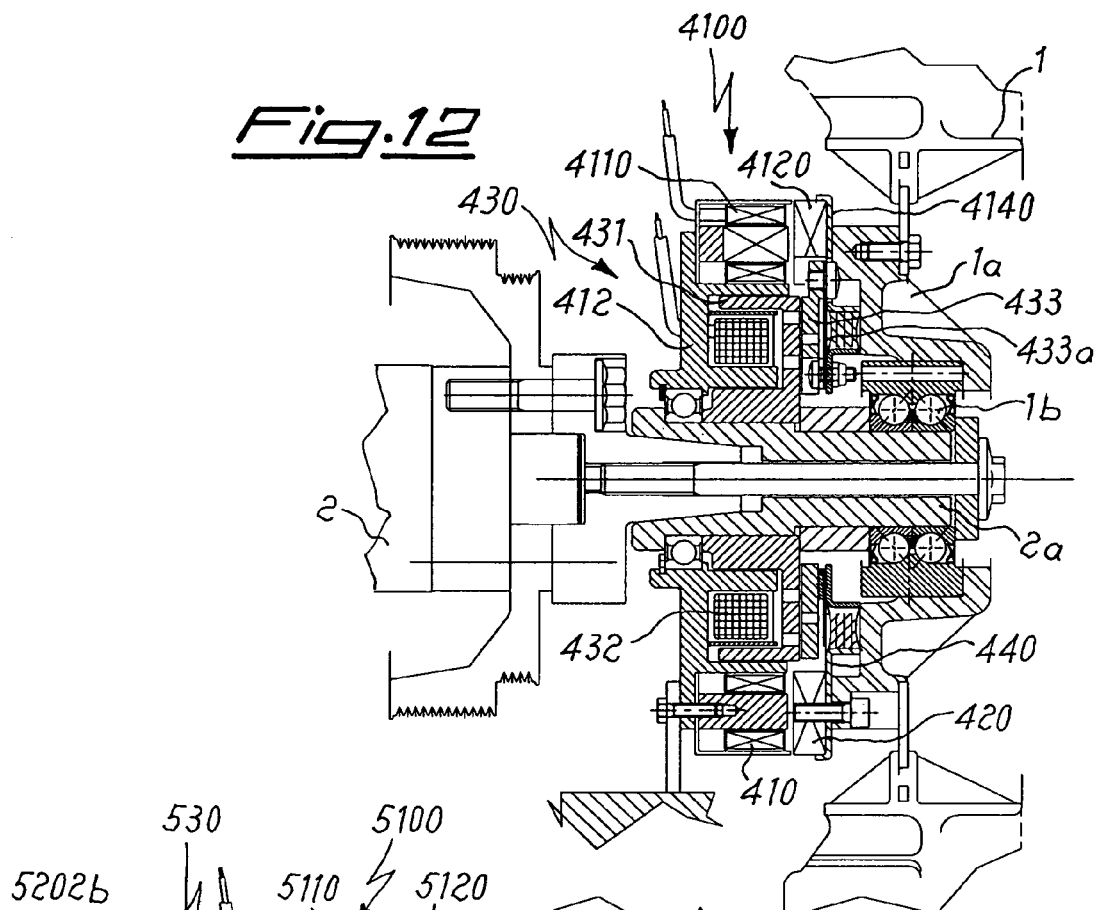
FIG. 12 shows a schematic axially sectioned view of a twelfth embodiment of the device according to the present invention.

FIG. 12 shows an embodiment of the device according to the invention in which the motor 4100 is provided coaxially with the coupling 430 instead of externally as in the previous cases.

In greater detail the fan 1 and the coupling 430 are mounted coaxially on the driving shaft 2 and the fixed support 412 of the electromagnet 432 also supports the auxiliary motor 4100 which has a concentric stator 4110 formed by windings with several N-S poles able to link up frontally with the rotor part 4120 integral with a flange 4140 in turn constrained to the support 1a of the fan 1 keyed onto the bearing 1b.

Figure 13:
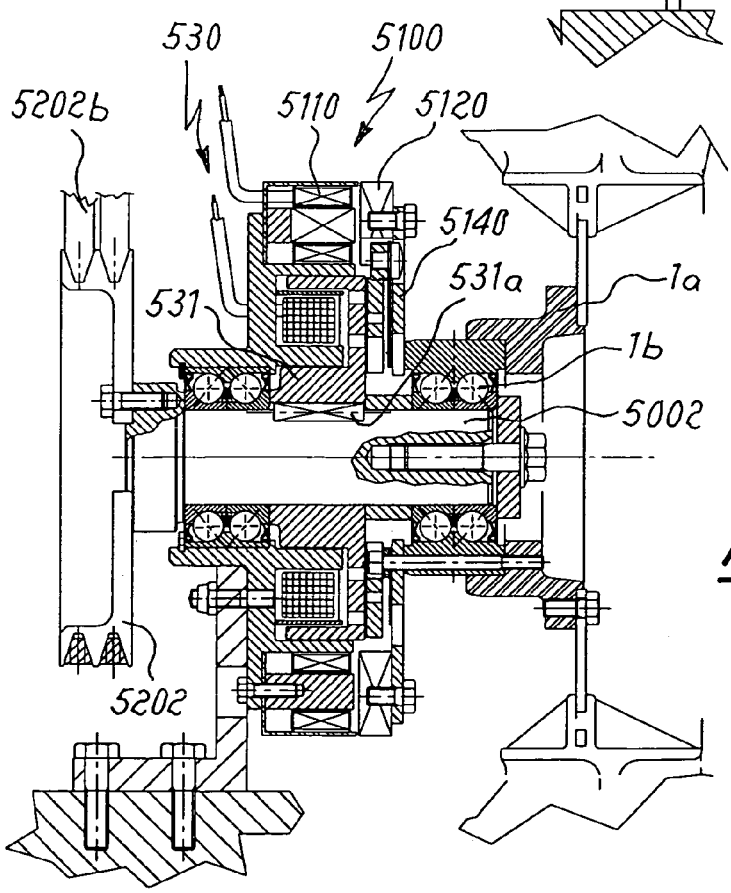
FIG. 13 shows a schematic axially sectioned view of a thirteenth embodiment of the device according to the present invention.

FIG. 13 shows an embodiment of the device according to the invention in which the auxiliary electric motor 5100 is formed coaxially with the coupling 530, but the coupling 530 and the fan 1 are mounted on a shaft 5002 parallel to the driving shaft 2 and actuated rotationally by means of a pulley 5202 moved by a belt 5202b connected to the said driving shaft (not shown).

The shaft 5002 causes rotation of the rotor 531 via a spline 531a.

The rotor 5120 of the motor 5100 is integral with a flange 5140 connected to the external thrust piece of the bearing 1b to which the support 201a of the fan 1 is also constrained.

Figure 14:
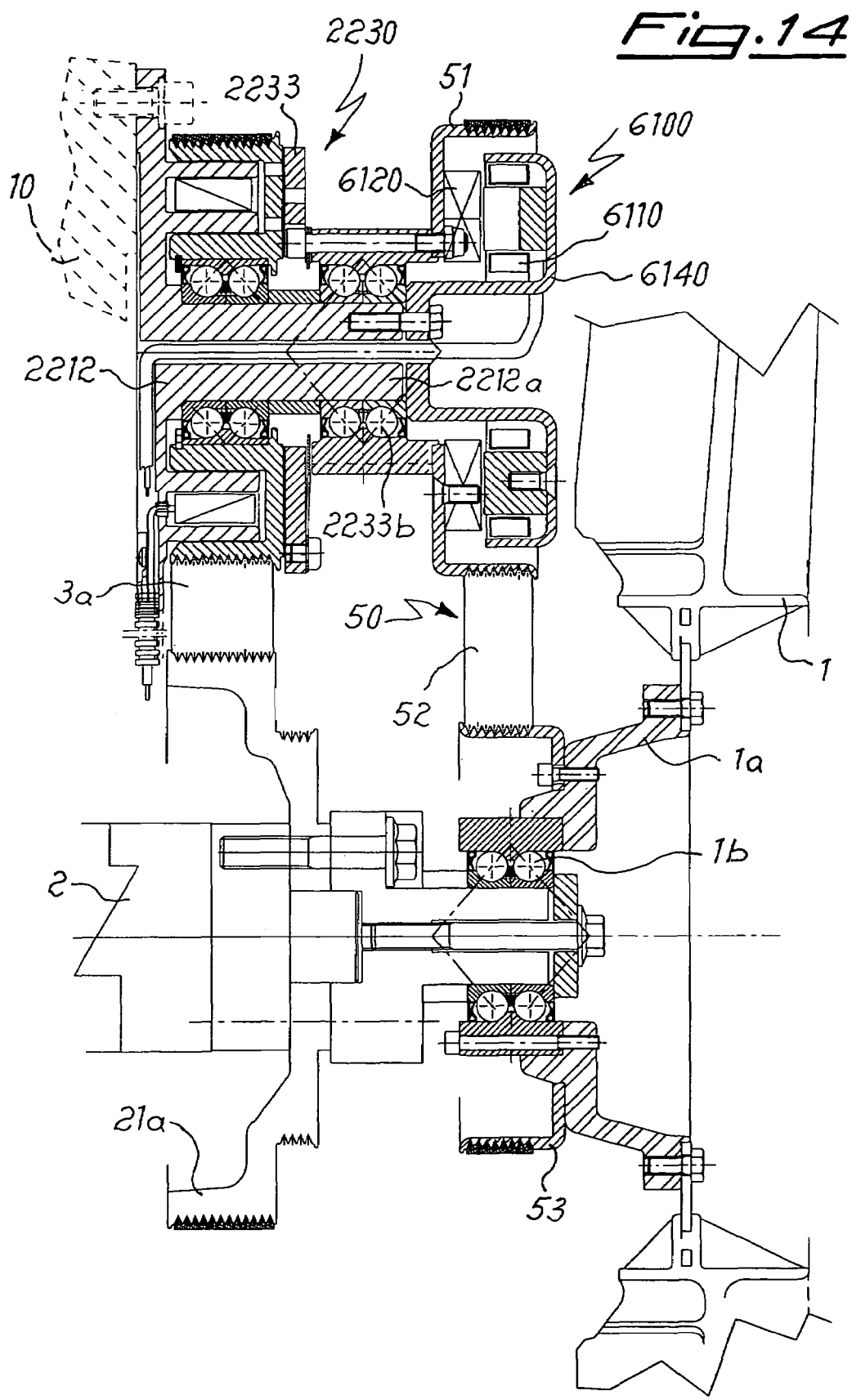
FIG. 14 shows a schematic axially sectioned view of a fourteenth embodiment of the device according to the present invention.

FIG. 14 shows an embodiment of the device wherein the fan 1 is mounted on the bearing 1b integral with the driving shaft 2, while the coupling 2 is mounted on a sleeve 2212a formed as one piece with a support 2212 fixed to the base 10 in a similar manner to that described for FIG. 10.

The auxiliary motor 6100 is in this case mounted coaxially with the sleeve 2212a by means of a bell member 6140 which supports the stator 6110, while the rotor part 6120 is mounted on a pulley 51 integral with the armature 2233 of the coupling 2230 by means of the outer race of the bearing 2233b.

The said pulley 51 is connected by means of the belt 2052 to the pulley 53 integral with the support 1a of the fan 1.

Figure 15:
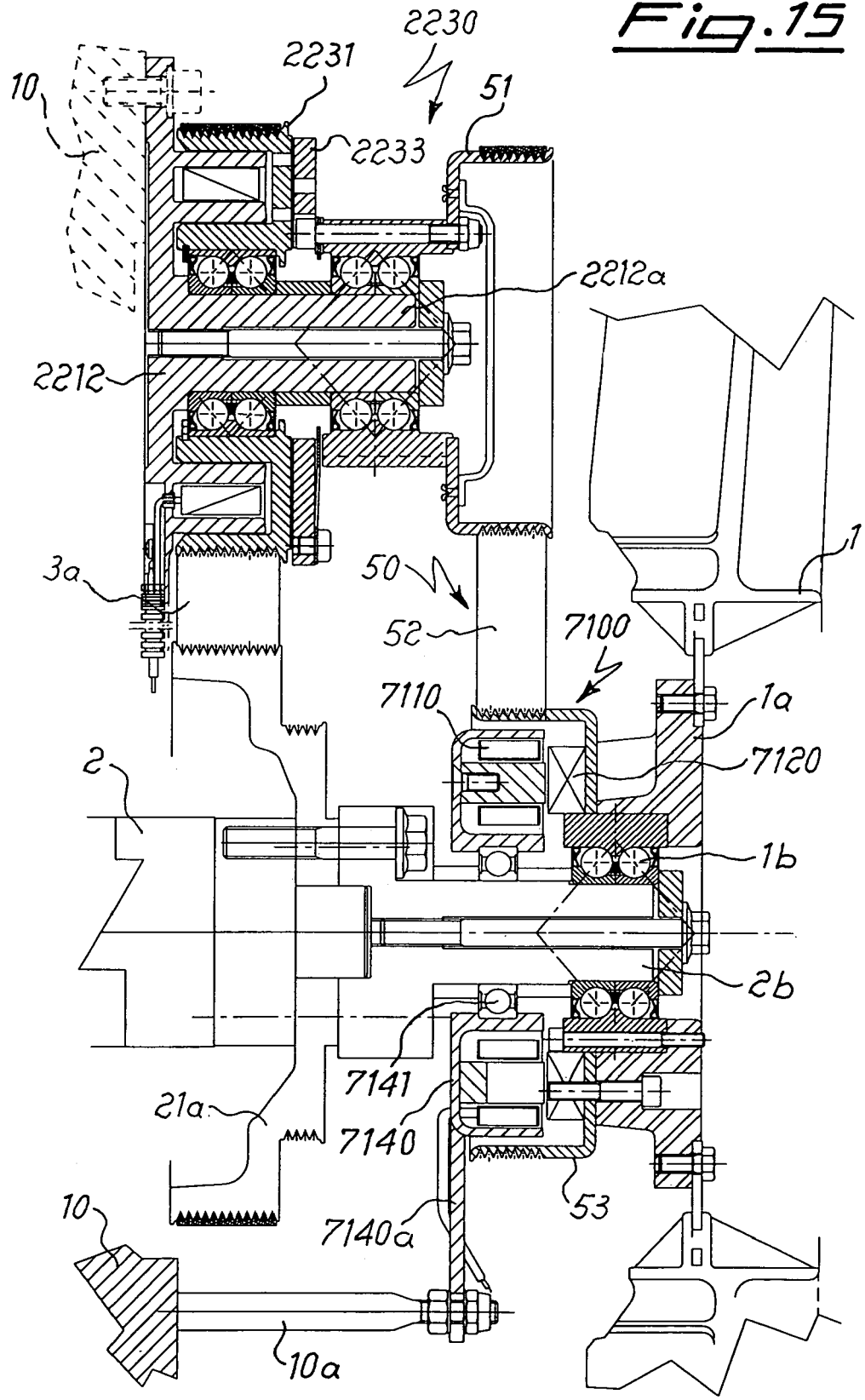
FIG. 15 shows a schematic axially sectioned view of a fifteenth embodiment of the device according to the present invention.

FIG. 15 shows a further embodiment, similar to that of FIG. 14, but with an auxiliary motor 7100 arranged coaxially with the fan 1, instead of with the coupling 2230. In greater detail, the motor 7100 is coaxially arranged between the pulley 53 integral with the fan and the driving shaft 2 and has a stator 7110 mounted on a support 7140 fixed to the base 10 by means of a flange 7140a and mounted on a bearing 7141 keyed onto the sleeve 2b; the rotor 7120 is integral with the pulley 53.

Figure 16:
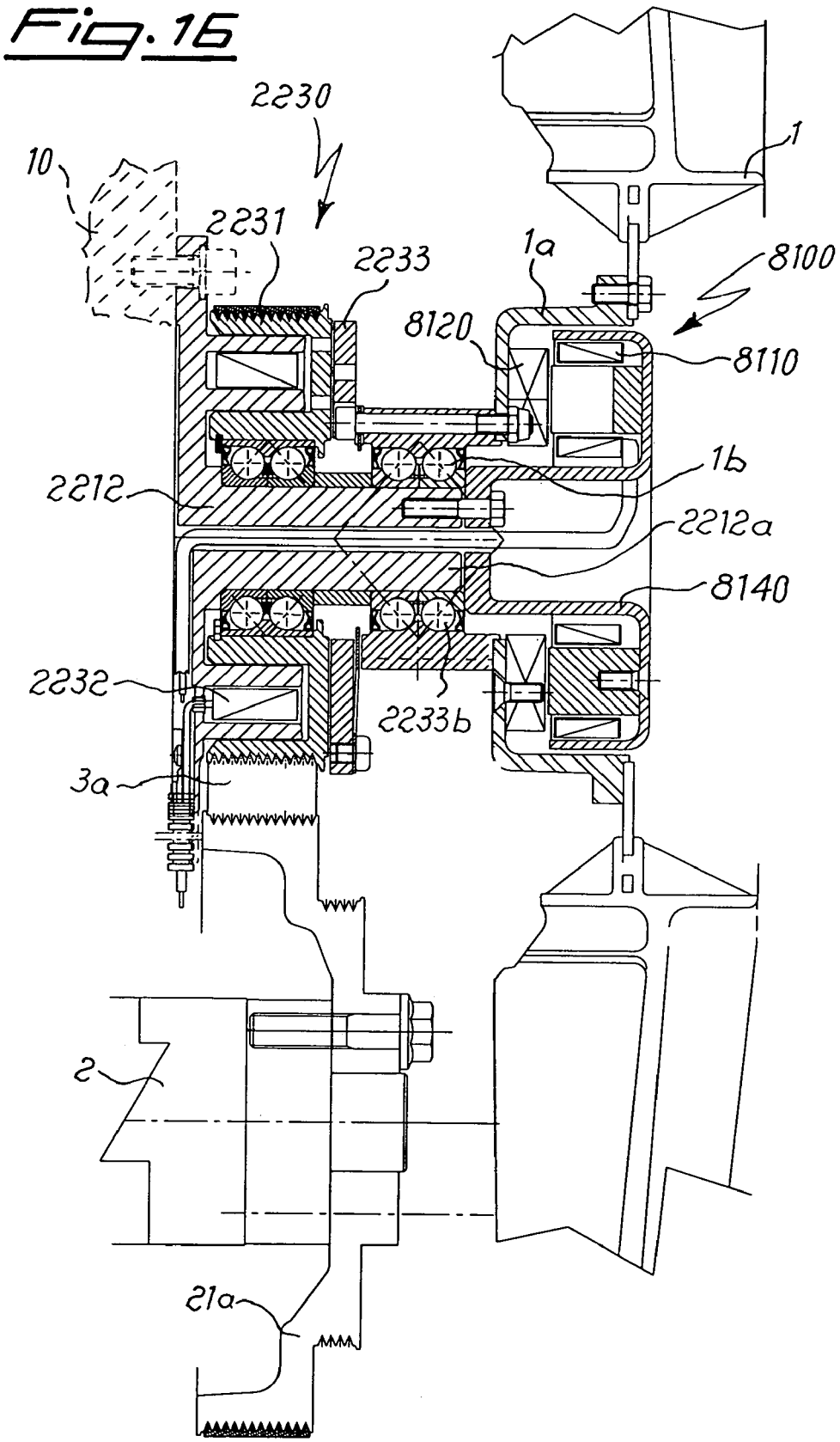
FIG. 16 shows a schematic axially sectioned view of a sixteenth embodiment of the device according to the present invention.

FIG. 16 shows an eighth embodiment with auxiliary motor 8100, fan 1 and coupling 2230 coaxially mounted on a fixed support 2212 with an axis parallel to that of the driving shaft 2 on which there is mounted a pulley 21a which actuates the rotor 2231 of the coupling 2230 by means of a corresponding belt 21b.

In this case the stator 8110 of the motor is integral with a bell member 8140 fixed to the sleeve 2212a of the support 2212, while the rotor 8120 is integral with the bell member 1a which supports the fan 1 and is constrained to the outer race of the bearing 2233b.

It can therefore be seen how the device according to the invention based on a clutch/electric motor coupling allows transmission of the movement to fans for cooling the fluid in vehicles, resulting in numerous advantages compared to the transmissions comprising clutches/parasitic current induction couplings, in particular as regards the maximum number of revolutions which can be transmitted with the electric motor which, unlike that which occurs with Foucault current couplings and owing to the relative driving can only reduce the revolutions transmitted to the fan, is not limited by the number of incoming revolutions.

In addition to this, the number of revolutions can be easily controlled by conventional programming and regulating means so as to allow operation of the fan at slow speeds by means of the electric motor and activation of the friction clutch only at high speeds with consequent savings in terms of consumable materials.

The invention claimed is:

1. A device for transmitting movement to a fan for cooling a cooling fluid in a motor vehicle, mounted, by means of an idle support on an axis parallel to a longitudinal axis (X-X) of a driving shaft of the vehicle, said device comprising:
    movement generating means which are coaxial and integral with the driving shaft;
    means for transmitting the movement of the driving shaft to a first clutch; and
    at least one first friction clutch with an electromagnetic actuating system, which is arranged on an axis parallel to the longitudinal axis (X-X) of the driving shaft and a rotor of which is connected to said means for transmitting and the engagement of which produces a rotation of the fan at a number of revolutions at least equal to that of the movement generating means, wherein the fan is mounted coaxially with the driving shaft.

2. A device according to claim 1, wherein first clutch is mounted on an axis parallel to that of the fan.

3. A device according to claim 1, wherein the means for transmitting the movement of the driving shaft to the first clutch consist of a pulley connected to the rotor of the first clutch by means of a drive belt.

4. A device according to claim 2, further comprising movement drive means arranged between said first clutch and the support of the fan, engagement of which causes rotation of the fan at a number of revolutions at least equal to that of the movement generating means.

5. A device according to claim 4, wherein said movement drive means arranged between said first clutch and the support of the fan comprise at least one first pulley and at least one second pulley connected together by an associated drive belt.

6. A device according to claim 5, wherein said first drive pulley is coaxial with the first clutch.

7. A device according to claim 5, wherein said second drive pulley is mounted idle coaxially with the driving shaft.

8. A device according to claim 5, wherein said second drive pulley is integral with the support of the fan.

9. A device according to claim 1, wherein said first clutch comprises a longitudinal hollow sleeve integral with a fixed flange constrained to the base of the engine.

10. A device according to claim 9, wherein a bearing supporting the rotor of the clutch is keyed on said longitudinal hollow sleeve.

11. A device according to claim 9, wherein said fixed flange has, mounted thereon, an annular electromagnet concentric with the rotor and axially arranged between the latter and the flange itself and electrically connected to a temperature sensor.

12. A device according to claim 9, wherein said first clutch comprises a bearing to a thrust piece of which a first drive pulley is constrained.

13. A device according to claim 12, wherein the rotor of the first clutch is connected to said thrust piece.

14. A device according to claim 2, wherein it comprises further comprising a second coupling of the induction type.

15. A device according to claim 14, wherein said second coupling is coaxially arranged between a free end of the movement generating means and the support of the fan.

16. A device according to claim 14, wherein said second coupling comprises a plurality of permanent magnets mounted on a retaining ring, which is made of non-magnetic material and integral with the bell member supporting the fan, and a ring, which is made of conductive material and forms an annular part of a rotor, which is made of non-magnetic material and integral with the movement generating means.

17. A device according to claim 1, further comprising a second controlled clutch of the mixed friction/induction type, such that the second controlled clutch has a friction part and an induction part.

18. A device according to claim 17, wherein the induction part of said second clutch comprises first engaging means of the electromagnetic type.

19. A device according to claim 18, wherein said electromagnetic engaging means comprise a permanent magnet and a controlled excitation coil.

20. A device according to claim 17, wherein a rotor of the second clutch has a circumferential flange together with which an annular element made of non-magnetic material is cast.

21. A device according to claim 17, wherein said second clutch is of the parasitic current type.

22. A device according to claim 17, wherein said second clutch is of the magnetic hysteresis type.

23. A device according to claim 17, wherein said second clutch is arranged coaxially with the first clutch.

24. A device according to claim 23, wherein said second clutch (60) is mounted on the free end of a hollow sleeve extending in the longitudinal direction and integrally joined to the rotor of the first clutch.

25. A device according to claim 24, wherein said magnet is mounted on the sleeve via a bearing arranged in between.

26. A device according to claim 25, wherein the support of the magnet is constrained to the fixed support shaft via resilient means.

27. A device according to claim 24, wherein the rotor (61) of the second clutch is mounted on the sleeve by means of a bearing.

28. A device according to claim 23, wherein the conductive element of the second clutch consists of an armature integral with the sleeve.

29. A device according to claim 28, wherein said armature is arranged on the side of the rotor opposite to that of the electromagnet and is rotationally constrained to the movement generating means by means of a resilient membrane.

30. A device according to claim 24, wherein it comprises a fixed shaft having a coaxial through-cavity.

31. A device according to claim 30, wherein the electric wires for connection to the electromagnet of the second friction clutch are arranged inside said coaxial through-cavity of the fixed shaft.

32. A device according to claim 17, wherein said second clutch is arranged coaxially with the driving shaft.

33. A device according to claim 32, wherein said second clutch is mounted on a sleeve coaxially integral with the extension of the driving shaft.

34. A device according to claim 33, wherein a bearing supporting the fixed annular electromagnet and a bearing supporting the rotor are keyed onto said sleeve.

35. A device according to claim 33, wherein said sleeve has, keyed thereon, a bearing to a thrust piece of which the fan support is constrained.

36. A device according to claim 1, wherein it comprises a second electromagnetic friction clutch, the rotor of which is connected to the movement generating means and which is able to transmit movement to the fan by means of a second drive so as to produce a rotational speed of the fan less than that of the driving shaft.

37. A device according to claim 36, wherein means for transmitting the movement of the driving shaft to the second clutch consist of a pulley connected to the rotor of the first clutch by means of a drive belt.

38. A device according to claim 36, wherein said movement drive means arranged between said second clutch and the support of the fan comprise at least one first pulley and at least one second pulley connected together by an associated drive belt.

39. A device according to claim 38, wherein said first drive pulley is coaxial with the second clutch.

40. A device according to claim 38, wherein said second drive pulley is integral with the support of the fan.

41. A device according to claim 36, wherein said second clutch comprises a longitudinal hollow sleeve integral with a fixed flange constrained to the base of the engine.

42. A device according to claim 41, wherein a bearing supporting the rotor of the clutch is keyed onto said longitudinal hollow sleeve.

43. A device according to claim 41, wherein said fixed flange has, mounted thereon, an annular electromagnet which is concentric with the rotor, axially arranged between the latter and the flange and electrically connected to a temperature sensor.

44. A device according to claim 36, wherein said second clutch comprises a bearing, to the thrust piece of which the first drive pulley is constrained.

45. A device according to claim 44, wherein the rotor of the second clutch is connected to said thrust piece.

46. A device according to claim 36, wherein said second clutch comprises a permanent magnet and a controlled excitation coil.

47. A device according to claim 41, wherein the rotor of the second clutch is mounted on the sleeve by means of a bearing.

48. A device according to claim 36, wherein said second clutch is arranged coaxially with the driving shaft.

49. A device according to claim 48, wherein said second clutch has a rotor connected to an extension of the driving shaft and armature integral with the support of the fan.

50. A device according to claim 48, wherein said second clutch has a permanent magnet integral with the electromagnet.

51. A device according to claim 50, wherein said electromagnet is of the controlled excitation type.

52. A device according to claim 48, wherein said second clutch is associated with a coupling of the induction type based on Foucault currents or parasitic currents.

53. A device according to claim 52, wherein said coupling is coaxial with the second clutch.

54. A device according to claim 52, wherein said coupling comprises a plurality of permanent magnets mounted on a retaining ring which is made of non-magnetic material and integral with the support of the fan, and a ring which is made of conductive material and forms an annular part of a rotor, which is made of non-magnetic material and integral with the extension of the driving shaft.

55. A device according to claim 1, wherein it comprises at least one auxiliary electric motor for actuating the fan independently of the said first electromagnetic clutch.

56. A device according to claim 55, wherein said auxiliary electric motor is arranged with the driving shaft parallel to the axis of rotation of the fan.

57. A device according to claim 56, wherein it comprises drive means for transmission of the movement from the shaft of the auxiliary motor to the fan.

58. A device according to claim 57, wherein said drive means comprise a first pulley integral with the shaft of the auxiliary motor.

59. A device according to claim 57, wherein the fan is coaxial with the driving shaft.

60. A device according to claim 59, wherein the first electromagnetic clutch is coaxial with the driving shaft.

61. A device according to claim 60, wherein said second pulley integral with the shaft of the auxiliary motor is connected by means of a belt to the first pulley coaxial with the driving shaft and the integral with the support of the fan.

62. A device according to claim 59, wherein the electromagnetic clutch is mounted on an axis parallel to the driving shaft.

63. A device according to claim 62, wherein said axis parallel to the driving shaft is fixed.

64. A device according to claim 63, wherein the rotor of the clutch has radial toothing designed to form a pulley for engagement with a belt for transmission of the movement.

65. A device according to claim 64, wherein the driving shaft has a pulley for transmission of the movement to the rotor by means of said belt.

66. A device according to claim 62, wherein the pulley integral with the shaft of the auxiliary motor is connected by means of a belt to a second pulley coaxial with the driving shaft and integral with the support of the fan and to a third pulley connected to the armature of the electromagnetic clutch.

67. A device according to claim 55, wherein said auxiliary electric motor is coaxial with the fan.

68. A device according to claim 67, wherein said auxiliary motor has a stator comprising windings with several (N-S) poles able to produce frontal linkage with the rotor part of the said motor.

69. A device according to claim 68, wherein said rotor part is integral with a flange connected to the support of the fan.

70. A device according to claim 67, wherein the fan J is coaxial with the electromagnetic clutch.

71. A device according to claim 70, wherein the auxiliary motor has a stator concentric with the electromagnetic clutch.

72. A device according to claim 70, wherein the electromagnetic clutch is mounted on a fixed axis parallel to that of the driving shaft.

73. A device according to claim 72, wherein the stator of the auxiliary motor is integral with a bell member coaxial and integral with the fixed axis.

74. A device according to claim 73, wherein said bell member of the stator of the auxiliary motor is arranged internally with respect to the support of the fan.

75. A device according to claim 73, wherein the rotor of the auxiliary motor is integral with the support of the fan.

76. A device according, to claim 72, wherein the rotor of the clutch has radial toothing able to form a pulley for engagement with a belt for transmission of the movement.

77. A device according to claim 76, wherein the driving shaft supports a pulley for transmission of the movement to the rotor by means of said belt.

78. A device according to claim 73, wherein the fan is coaxial with the driving shaft and the clutch is mounted on a fixed axis parallel to the driving shaft.

79. A device according to claim 78, wherein said bell member of the stator of the auxiliary motor is arranged internally in the axial direction with respect to the support of the fan.

80. A device according to claim 78, wherein said electromagnetic clutch comprises a pulley connected by means of a belt to a pulley integral with the support of the fan.

81. A device according to claim 55, wherein said auxiliary electric motor is coaxial with the electromagnetic clutch.

82. A device according to claim 81, that wherein the fan is coaxial with the driving shaft.

83. A device according to claim 81, that wherein said clutch is mounted on a fixed axis parallel with the driving shaft.

84. A device according to claim 82, that wherein the stator of the auxiliary motor is integral with a bell member coaxial and integral with the fixed axis.

85. A device according to claim 83, wherein said electromagnetic clutch comprises a pulley connected by means of a belt to a pulley integral with the support of the fan.

* * * * *